United States Patent [19]

Nomura et al.

[11] Patent Number: 4,987,173

[45] Date of Patent: Jan. 22, 1991

[54] POLYOLEFIN RESIN COMPOSITION CONTAINING FIBROUS INORGANIC FILLER

[75] Inventors: Manabu Nomura, Sodegaura; Ryuzo Tomomatsu; Kazuaki Kihara, both of Ichihara, all of Japan

[73] Assignee: Idemitsu Petrochemical Co., Ltd., Tokyo, Japan

[21] Appl. No.: 288,098

[22] Filed: Dec. 22, 1988

Related U.S. Application Data

[63] Continuation of Ser. No. 929,346, Nov. 12, 1986, abandoned.

[30] Foreign Application Priority Data

Nov. 13, 1985 [JP] Japan ................. 60-252941

[51] Int. Cl.$^5$ ................. C08K 3/30; C08K 3/22
[52] U.S. Cl. ................. 524/423; 524/436; 524/449; 524/451; 524/505; 524/525
[58] Field of Search ................. 524/423, 436, 525

[56] References Cited

U.S. PATENT DOCUMENTS 4,433,073  2/1984  Sano et al. ................. 523/201
4,603,153  7/1986  Sobajima et al. ................. 523/209

FOREIGN PATENT DOCUMENTS 72058   6/1978  Japan .
146749 12/1978  Japan .
41947   3/1979  Japan .
134134  8/1983  Japan .

Primary Examiner—Lewis T. Jacobs
Assistant Examiner—David W. Woodward
Attorney, Agent, or Firm—Antonelli, Terry, Stout & Kraus

[57] ABSTRACT

A polyolefin resin composition comprising from 30% to 96% by weight of a polyolefin, from 3% to 50% by weight of a fibrous inorganic filler selected from the group consisting of a magnesium hydroxide fiber, a magnesium oxide fiber, and a gypsum fiber having a mean fiber diameter of from 0.1 to 2 μm and an aspect ratio of from 20 to 100 or a mixture of two or more of said inorganic fillers, and from 1% to 60% by weight of a thermoplastic elastomer.

The said composition provides a molded material which has a good external appearance and is excellent in the impact strength, rigidity, and heat stability.

8 Claims, No Drawings

POLYOLEFIN RESIN COMPOSITION CONTAINING FIBROUS INORGANIC FILLER

This is a continuation of application Ser. No. 929,346, filed Nov. 12, 1986 now abandoned.

BACKGROUND OF THE INVENTION (1) Field of the Invention

This invention relates to a polyolefin resin composition which is useful for industrial materials, particularly bumpers, instrument panels, and various trims of cars, various housings of light electrical appliances, and the like.

(2) Description of the Prior Art

Polyolefin resin compositions have been widely used mainly in the fields of car parts and light electrical appliances. In recent years, required various properties of the polyolefin resin compositions have become very high as the fields of the use have been widened. The blending of a thermoplastic elastomer has been practiced to improve the impact strength of polypropylenes. However, as a disadvantage in the method, there are problems, such as the decrease of the mechanical strength, rigidity, and heat stability. As a method to solve the problems, the blending of a fibrous or non-fibrous inorganic filler has been practiced. However, the reinforcing effect in the mechanical strength and the increase of the heat stability of the polypropylene blended with a non-fibrous inorganic filler are smaller than those of the polypropylene blended with a fibrous inorganic filler causing the appearance of flow mark or the deterioration of the external appearance in the weld. On the other hand, when a fibrous inorganic filler is blended, though the reinforcing effect in the mechanical strength is large, there occurs a silver streak surface roughness or a decrease in the impact strength. Also, the blending of a fibrous and a non-fibrous inorganic fillers in combination has been practiced without sufficient effects. Also, the combination of fibrous magnesium oxysulfate and other inorganic fillers has been proposed (cf. Japanese Patent Laid-open No. 227936/1984). However, in this method, when the fibrous magnesium oxysulfate is blended in a large amount or the molding temperature is elevated, a decomposition occurs to cause the silver streak and the deterioration of the external appearance.

SUMMARY OF THE INVENTION

An object of the present invention is to provide a polyolefin resin composition having a good external appearance and improved impact strength, rigidity, and heat stability.

Thus, the polyolefin resin composition of the present invention comprises from 30 to 96% by weight of a polyolefin, from 3 to 50% by weight of a fibrous inorganic filler selected from the group consisting of a magnesium hydroxide fiber, a magnesium oxide fiber, and a gypsum fiber having a mean fiber diameter of from 0.1 to 2 $\mu$m and an aspect ratio of from 20 to 100 or a mixture of two or more of the said fibrous inorganic fillers, and from 1 to 60% by weight of a thermoplastic elastomer.

DETAILED DESCRIPTION OF THE INVENTION

The polyolefin to be used in the present invention includes a polypropylene, a polypropylene containing a polyethylene component, and a mixture of a polypropylene and a polyethylene.

The polypropylene to be used in the present invention includes a crystalline polypropylene, a crystalline polypropylene modified with a polymerizing vinyl monomer, such as maleic anhydride, acrylic acid, and glycidyl methacrylate, or an organic silane compound containing an unsaturated group, such as vinylsilane and $\gamma$-methacryloxypropyltrimethoxysilane, and the like.

The polypropylene containing a polyethylene component to be used in the present invention is not particularly restricted, and the following polymers are preferable:

(i) an ethylene-propylene random copolymer,
(ii) a copolymer composition consisting of an ethylene-propylene random copolymer and a homopolypropylene (what is called propylene ethylene block copolymer on the market), and
(iii) a composition consisting of the above said (i) or (ii) and a propylene homopolymer.

Within these polymers, those having a MI (melt index) of from 2 to 70 g/10 min. are preferable.

Preferable mixture of a polypropylene and a polyethylene is a mixture consisting of from 5 to 30% by weight of a polyethylene and from 95 to 70% by weight of the above said copolymer composition (ii).

The polyethylene to be used includes a high density polyethylene, a medium and low density polyethylenes, and a linear low density polyethylene, and preferably, those having a MI of from 3 to 50 g/10 min. are used.

Further, the fibrous inorganic filler to be used in the present invention has a mean fiber diameter of from 0.1 to 2 $\mu$m and an aspect ratio of from 20 to 100. When the mean fiber diameter is larger than 2 $\mu$m and, at the same time, the aspect ratio is larger than 100, the impact strength is decreased, and the external appearance is deteriorated. When the aspect ratio is smaller than 20, the improving effect in the rigidity is small.

The amount of the fibrous inorganic filler to be blended is from 3 to 50% by weight, preferably from 5 to 30% by weight. When the amount is less than 3% by weight, the inproving effect in the rigidity is small, and when it is more than 50% by weight, there occur both of the decrease of the impact strength and the increase of the specific gravity, and therefor the obtained composition becomes not applicable to practical use.

In case of necessity, these fibrous inorganic fillers may be treated with a surface treating agent, such as publicly known silane coupling agents, titanate coupling agents, and the like.

The thermoplastic elastomer to be used in the present invention includes ethylene propylene rubbers (EPR), ethylene propylene diene rubbers (EPDM), styrene butadiene rubbers (SBR), styrene-butadiene styrene rubbers (SBS), styrene isoprene rubbers (SIS), and the like, and ethylene propylene rubbers, ethylene propylene diene rubbers, and styrene butadiene rubbers are preferable.

The amount of the thermoplastic elastomer to be used in the present invention is from 1 to 60% by weight, preferably from 3 to b 30% by weight, and when the amount is more than 60% by weight, the rigidity is considerably decreased.

The rigidity is increased still more by blending from 3 to 30 parts by weight of talc having a mean particle diameter of from 0.1 to 10 $\mu$m or mica having a mean particle diameter of from 30 to 300 $\mu$m to 100 parts by weight of the polyolefin resin composition of the present invention. The amount of more than 30 parts by weight is not desirable because it causes the decreases of the impact strength and the weld strength and the appearance of the flow mark.

When the mean particle diameter of talc is less than 0.1 μm, the aspects are destructed resulting in a poor improving effect in the rigidity. Also, talc having such mean particle diameter does not disperse sufficiently and the impact strength is decreased. When it is more than 10 μm, the impact strength is decreased. Also, when the mean particle diameter of mica is less than 30 μm, the improving effect in the rigidity is decreased, and when it exceeds 300 μm, there occurs the surface roughness, and the surface appearance is deteriorated.

Further, in case of necessity, talk and mica may be treated with a treating agent of silane coupling agent system, higher fatty acid system, fatty acid metallic salt system, maleic anhydride system, acrylic acid system, organic titanate system or resin acid system.

The polyolefin resin composition of the present invention may be blended with other resins, for example, nylons, polycarbonates, acrylonitrile-styrene-butadiene resins, polystyrenes, polyvinylchlorides, polyphenyleneoxides, ethylene-vinyl acetate copolymers, and the like, to an extent in which the quality is not ruined.

Further, in the present invention, in addition to the above said components, conventional additives which is usually used, for example, antioxidants, UV absorbers, anti-static agents, lubricants, pigments, nucleating agents, dispersing agents, coupling agents, plasticizers, and other organic or inorganic additives, may be added properly.

The preparation of the composition of the present invention may be carried out by blending each component in a predetermined amount, preliminarily preblending by the use of a Henschel mixer, ribbon blender, V-shaped blender, and the like, thereafter kneading sufficiently in a way of a dry mixing-melt mixing combined method, a multistage melt method, a simple melt mixing method, and the like. The kneading may be carried out using a Bambary mixer, a Kokneader, a uniaxial extruder, a biaxial extruder, and the like at a temperature of not lower than 180° C., preferably not lower than 210° C. In the mixing and melt mixing, the sequent order of the addition and mixing of the said components are not particularly restricted.

When a molded material is produced from the composition of the present invention, various molding methods, for example, an injection molding, an extruding molding, a blow molding, a compression molding, a laminating, a roll fabricating, orientation fabricating, stamp fabricating, and the like, may be applied.

EXAMPLES 1 TO 16 AND COMPARATIVE EXAMPLES 1 TO 5

This invention is described in more details with reference to the following examples, but the scope of the invention is not meant to be limited to these specific examples.

The compounds listed on Table were mixed using a V-shaped blender, thereafter melt mixed using a uniaxial extruder to obtain pellets.

The obtained pellets were molded using an injection molder to form test strips, then the izod impact strength, flexural modulus, and heat distortion temperature were measured.

Further, square boards of 800 mm × 200 mm × 3 mm thick were injection molded at the temperature of 250° C. The surfaces of the obtained square boards were observed by a visual inspection.

The results are shown in the Table.

Izod impact strength: measured according to JIS-K-7110.

Flexural modulus: measured according to JIS-K-7203.

Heat distortion temperature: measured according to JIS-K-7207. (18.6 kg/cm weight)

Flexural strength: measured according to JIS-K-7203.

TABLE

|  | Polyolefin resin | | Fibrous inorganic filler | | Thermoplastic elastomer | | Inorganic filler | |
| --- | --- | --- | --- | --- | --- | --- | --- | --- |
|  | Type | wt. % | Type | wt. % | Type | wt. % | Type | wt. part |
| Example 1 | A | 85 | a | 10 | I | 5 | — | — |
| Example 2 | A | 85 | b | 10 | I | 5 | — | — |
| Example 3 | A | 85 | c | 10 | I | 5 | — | — |
| Example 4 | B | 85 | b | 10 | I | 5 | — | — |
| Example 5 | A | 85 | a | 10 | II | 5 | — | — |
| Example 6 | A | 85 | a | 5 | I | 10 | — | — |
| Example 7 | A | 50 | a | 20 | I | 30 | — | — |
| Example 8 | A | 65 | b | 5 | I | 30 | — | — |
| Example 9 | A | 65 | c | 5 | I | 30 | — | — |
| Example 10 | C | 65 | c | 5 | I | 30 | — | — |
| Example 11 | B | 65 | b | 5 | III | 30 | — | — |
| Comparative Example 1 | A | 85 | d | 10 | I | 5 | — | — |
| Comparative Example 2 | A | 65 | e | 5 | II | 30 | — | — |
| Comparative Example 3 | A | 50 | f | 20 | III | 30 | — | — |
| Comparative Example 4 | A | 25 | a | 70 | II | 5 | — | — |
| Comparative Example 5 | A | 28 | a | 2 | I | 70 | — | — |
| Example 12 | A | 85 | a | 10 | I | 5 | X | 10 |
| Example 13 | A | 85 | a | 10 | II | 5 | X | 10 |
| Example 14 | A | 65 | a | 5 | I | 30 | Y | 15 |
| Example 15 | B | 65 | b | 5 | III | 30 | X | 15 |
| Example 16 | C | 65 | c | 5 | I | 30 | X | 15 |

TABLE-continued

| | External appearance | Izod impact strength (−30° C.) (knoched type) kg · cm/cm | Flexural strength kg/cm$^2$ | Flexural modulus kg/cm$^2$ | Heat distortion temperature (°C.) |
| --- | --- | --- | --- | --- | --- |
| Example 1 | good | 5.8 | 541 | 33200 | 82 |
| Example 2 | good | 6.2 | 532 | 30700 | 80 |
| Example 3 | good | 5.5 | 555 | 34600 | 83 |
| Example 4 | good | 5.5 | 551 | 34200 | 83 |
| Example 5 | good | 5.3 | 557 | 33900 | 83 |
| Example 6 | good | 8.9 | 479 | 19700 | 76 |
| Example 7 | good | NB | 334 | 18700 | 72 |
| Example 8 | good | NB | 271 | 13100 | 66 |
| Example 9 | good | NB | 283 | 13700 | 68 |
| Example 10 | good | NB | 256 | 12600 | 64 |
| Example 11 | good | NB | 258 | 12900 | 65 |
| Comparative Example 1 | good | 1.8 | 409 | 24100 | 77 |
| Comparative Example 2 | surface roughness | 14 | 307 | 12900 | 69 |
| Comparative Example 3 | silver appeared | NB | 321 | 17700 | 70 |
| Comparative Example 4 | (difficult to produce) | | | | |
| Comparative Example 5 | good | NB | 82 | not more than 3000 | not more than 50 |
| Example 12 | good | 4.9 | 457 | 36900 | 83 |
| Example 13 | good | 5.0 | 466 | 38800 | 85 |
| Example 14 | good | 63 | 293 | 19700 | 72 |
| Example 15 | good | NB | 283 | 17300 | 67 |
| Example 16 | good | NB | 275 | 16900 | 66 |

Polyolefin

A. Idemitsu Polypropylene J465H (produced by Idemitsu Petrochemical Co., Ltd.), MI=2.7 g/10 min., ethylene content: 11.8 wt %.

B. Idemitsu Polypropylene J762H (produced by Idemitsu Petrochemical Co., Ltd.), MI=10 g/10 min., ethylene content: 8.4 wt %.

C. mixture of 90% by weight of Idemitsu Polypropylene J750H (produced by Idemitsu Petrochemical Co., Ltd.), MI=11 g/10 min., ethylene content: 5.8 wt % and 10% by weight of Idemitsu Polyethylene 210J (produced by Idemitsu Petrochemical Co., Ltd.), MI=6 g/10 min., density: 0.968 g/cm.

| Fibrous inorganic filler | | Fiber diameter | Aspect ratio |
| --- | --- | --- | --- |
| a | magnesium hydroxide fiber | 0.2 μm | 50 |
| b | magnesium oxide fiber | 0.3 μm | 40 |
| c | gypsum fiber | 0.6 μm | 60 |
| d | wollastonite | 0.2 μm | 50 |
| e | glass fiber | 13 μm | 230 |
| f | fibrous magnesium oxysulfate | 0.8 μm | 40 |

Thermoplastic elastomer

I. ethylene propylene rubber EP02P (produced by Japan Synethetic Rubber Co., Ltd.).

II. ethylene propylene diene rubber EP57P (produced by Japan Synthetic Rubber Co., Ltd.).

III. styrene butadiene rubber Kaliflex TR1102 (produced by Shell Chemical Co., Ltd.).

Inorganic filler

X: talc having the mean grain diameter of 0.8 μm.

Y: mica having the mean grain diameter of 75 μm.

What is claimed is:

1. A polyolefin resin composition prepared by kneading a mixture comprising from 40 to 92% by weight of a polyolefin, from 5 to 30% by weight of a fibrous inorganic filler, and from 3 to 30% by weight of a thermoplastic elastomer based on the total amount of the mixture, the polyolefin being selected from the group consisting of a crystalline polypropylene, a crystalline polypropylene containing a polyethylene component, and a mixture of a crystalline polypropylene and a polyethylene, the fibrous inorganic filler having a mean fiber diameter of from 0.1 to 2 μm and an aspect ratio of from 50 to 100 and being selected from the group consisting of a magnesium hydroxide fiber, a gypsum fiber, and mixtures thereof, and the thermoplastic elastomer being selected from the group consisting of an ethylene propylene rubber, an ethylene propylene diene rubber, and a styrene butadiene rubber.

2. The polyolefin resin composition as claimed in claim 1 wherein said crystalline polypropylene containing a polyethylene component is a crystalline propylene ethylene block copolymer.

3. The polyolefin resin composition as claimed in claim 1 wherein said mixture of a crystalline polypropylene and a polyethylene is a mixture consisting of from 5 to 30% by weight of a polyethylene and from 95 to 70% by weight of a crystalline propylene ethylene block copolymer.

4. The polyolefin resin composition as claimed in claim 1, wherein the fibrous inorganic filler is magnesium hydroxide fiber.

5. A polyolefin resin composition prepared by kneading an admixture comprising 100 parts by weight of a polyolefin resin composition mixture comprising from 40 to 92% by weight of a polyolefin, from 5 to 30% by weight of a fibrous inorganic filler, and from 3 to 30% by weight of a thermoplastic elastomer based on the total amount of the mixture, the polyolefin being selected from the group consisting of a crystalline polypropylene, a crystalline polypropylene containing a polyethylene component, and a mixture of a crystalline polypropylene and a polyethylene, the fibrous inorganic filler having a mean fiber diameter of from 0.1 to 2 μm and an aspect ratio of from 50 to 100 and being selected from the group consisting of a magnesium hydroxide fiber, a gypsum fiber, and mixtures thereof, and the thermoplastic elastomer being selected from the group consisting of an ethylene propylene rubber, an ethylene propylene diene rubber and a styrene butadiene rubber, and from 3 to 30 parts by weight of talc having a mean particle diameter of from 0.1 to 10 μm or mica having a mean particle diameter of from 30 to 300 μm.

6. The polyolefin resin composition as claimed in claim 5, wherein the fibrous inorganic filler is magnesium hydroxide fiber.

7. The polyolefin resin composition as claimed in claim 5 wherein said crystalline polypropylene comprising a polyethylene component is a crystalline propylene ethylene block copolymer.

8. The polyolefin resin composition as claimed in claim 5 wherein said mixture of a crystalline polypropylene and a polyethylene is a mixture consisting of from 5 to 30% by weight of a polyethylene and from 95 to 70% by weight of a crystalline propylene ethylene block polymer.

* * * * *